United States Patent [19]

Lennon et al.

[11] Patent Number: 5,345,679

[45] Date of Patent: Sep. 13, 1994

[54] METHOD OF MAKING PLASTIC BALL SLEEVE ASSEMBLY

[75] Inventors: Brady J. Lennon, Freeland; Howard D. Beauch, Frankenmuth; Russell L. Herlache, Saginaw, all of Mich.

[73] Assignee: General Motors Corporation, Detroit, Mich.

[21] Appl. No.: 105,245

[22] Filed: Aug. 12, 1993

[51] Int. Cl.⁵ .................................. B21D 53/10
[52] U.S. Cl. ........................ 29/898.055; 29/441.1; 29/898.044; 29/898.056; 29/898.065
[58] Field of Search ............ 29/509, 898.043, 898.044, 29/898.045, 898.05, 898.055, 898.063, 898.066, 898.15, 441.1, 436, 898.056, 898.057, 898.065; 72/368; 74/492

[56] References Cited

U.S. PATENT DOCUMENTS

| | | | |
|---|---|---|---|
| 848,776 | 4/1907 | Sisson | 29/441.1 |
| 1,330,158 | 2/1920 | Arnold | 29/441.1 X |
| 2,324,083 | 7/1943 | Holmes | 29/898.055 |
| 3,392,599 | 7/1968 | White | 74/492 |
| 3,538,783 | 11/1970 | Butts | 74/492 |
| 3,538,785 | 11/1970 | Grancon | 74/492 |
| 3,788,148 | 1/1974 | Connell et al. | 74/492 |
| 4,006,647 | 2/1977 | Oonuma et al. | 74/492 |
| 4,028,961 | 6/1977 | Utsumi et al. | 74/492 |
| 4,509,386 | 4/1985 | Kimberlin | 74/492 |
| 4,550,479 | 11/1985 | Walter et al. | 29/898.066 |
| 4,867,003 | 9/1989 | Beauch et al. | 74/492 |

FOREIGN PATENT DOCUMENTS 0584004 1/1947 United Kingdom ............ 29/898.15

*Primary Examiner*—Timothy V. Eley
*Assistant Examiner*—Khan V. Nguyen
*Attorney, Agent, or Firm*—Saul Schwartz

[57] ABSTRACT

A method of making a plastic ball sleeve assembly includes the steps of forming a flat plastic sleeve blank, cold forming a plurality of ball sockets in the sleeve blank, cold forming a plurality of integral living hinges in the sleeve blank, inserting respective ones of a plurality of hard metal spheres in corresponding ones of the ball sockets, cold forming the sleeve blank to define retaining means at each ball socket operative to retain the spheres in the sockets while exposing surface segments of the spheres on opposite sides of the sleeve blank, and flexing the sleeve blank at the living hinges until opposite end edges of the sleeve blank abut whereby a tubular ball sleeve assembly is achieved. In a preferred embodiment, interlocking tangs and notches are formed in edges of the sleeve blank which interlock to capture the tubular shape of the ball sleeve assembly.

4 Claims, 4 Drawing Sheets

METHOD OF MAKING PLASTIC BALL SLEEVE ASSEMBLY

FIELD OF THE INVENTION

This invention relates to energy absorbing steering columns for motor vehicles.

BACKGROUND OF THE INVENTION

In energy absorbing motor vehicle steering columns such as described in U.S. Pat. No. 3,392,599, issued July 16, 1968 and assigned to the assignee of this invention, a collapse stroke of the column is characterized by telescopic collapse or plunging of a tubular upper mast jacket over a tubular lower mast jacket. Collapse of the upper mast jacket is resisted by a plurality of hard steel spheres having an interference press fit in an annulus defined where the upper and lower mast jackets overlap. When the forces urging collapse exceed a magnitude corresponding to the strain limit of the material from which the mast jackets are made, collapse commences and the spheres effect energy absorption by permanently cold forming or plowing tracks in the mast jackets. The spheres are seated in ball sockets in a tubular plastic ball sleeve which maintains the relative positions of the spheres during a collapse stroke of the column and which affords a convenient platform for handling the spheres prior to installation on the steering column. Commonly, plastic ball sleeve assemblies are made by injection molding nylon or some other polymeric material in a tubular cavity to form a sleeve with ball sockets therein and then inserting the spheres in the ball sockets. Core pins of the molding apparatus form the ball sockets and must be mechanically withdrawn from the sleeve before the latter can be extracted from the mold. A method according to this invention of making a plastic ball sleeve assembly for an energy absorbing motor vehicle steering column is an improvement relative to the aforesaid injection molding method.

SUMMARY OF THE INVENTION

This invention is a new and improved method of making a tubular plastic ball sleeve assembly for an energy absorbing motor vehicle steering column of the type in which a plastic ball sleeve is disposed in an annulus defined between overlapped ends of upper and lower mast jackets of the column with steel spheres, seated in ball sockets in the sleeve, interference press fitted between the overlapped ends of the mast jackets. The method according to this invention includes the steps of forming a flat sleeve blank having a dimension corresponding to the circumference of the tubular ball sleeve and a dimension corresponding to the length of the tubular ball sleeve, mechanically cold forming a plurality of ball sockets in the sleeve blank, mechanically cold forming a plurality of living hinges in the sleeve blank extending in the direction of the length dimension, inserting a steel sphere in each cold formed socket, cold forming the sleeve blank to define retaining lips around the ball sockets, and flexing the sleeve blank at the living hinges to form a tubular sleeve. The flat blank may be formed by severing an end from a continuous roll of plastic in sheet form, by in-line extrusion, or any other convenient method. In a preferred embodiment, the plastic is nylon or some other polymeric material, the ball sockets are mechanically cold formed with an annular lip adjacent one end, and a similar lip is coined at the other end of each socket after the spheres are inserted. Interlocking tabs and notches may be formed at opposite ends of the sleeve blank.

DESCRIPTION OF PREFERRED EMBODIMENTS

Figure 1:
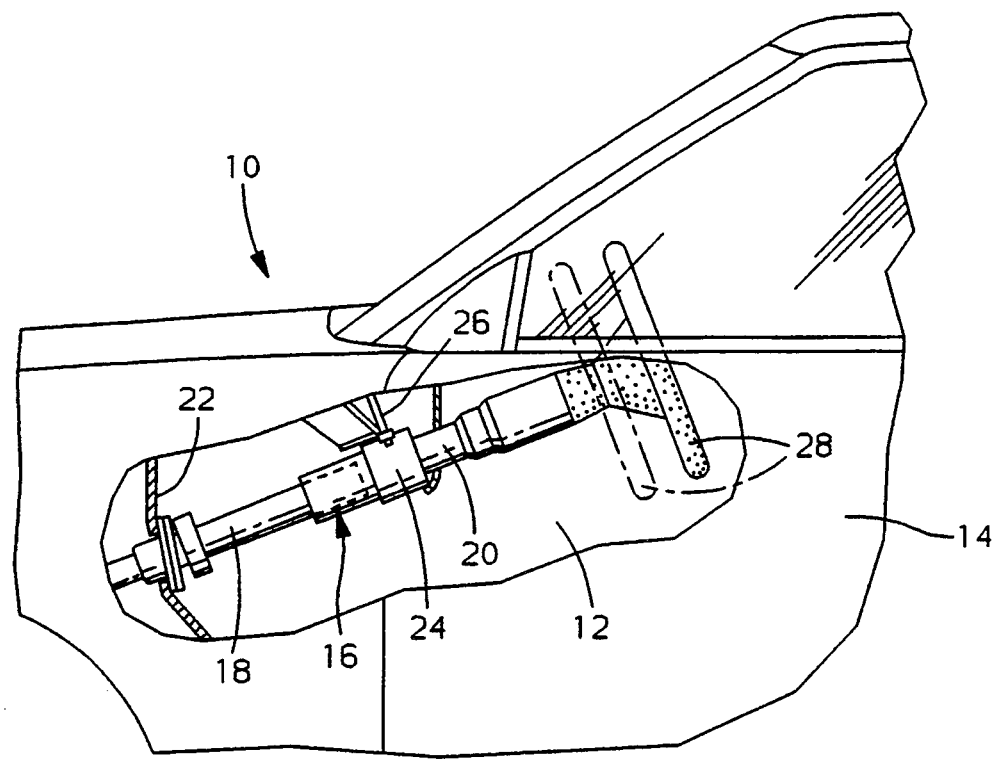
FIG. 1 is a fragmentary, partially broken-away view of a motor vehicle having an energy absorbing steering column including a plastic ball sleeve assembly made by a method according to this invention.
Figure 2:
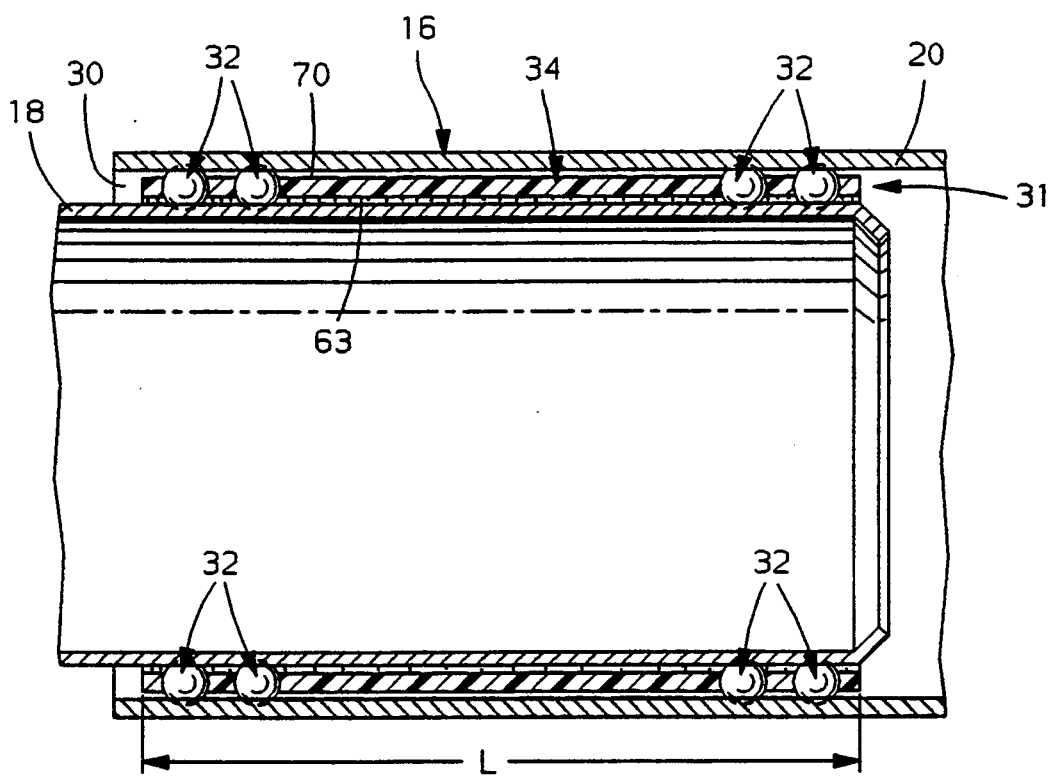
FIG. 2 is an enlarged, broken-away view of a portion of FIG. 1.

Referring to FIGS. 1 and 2, a motor vehicle 10 has a passenger compartment 12 defined within a body 14 of the vehicle. An energy absorbing steering column 16 of the vehicle, such as described in the aforesaid U.S. Pat. No. 3,392,599, has a tubular lower mast jacket 18 and a tubular upper mast jacket 20. The lower end of the lower mast jacket bears against a panel 22 of the body. A bracket 24 on the upper mast jacket is releasably connected to an instrument panel support of the body 14 by a pair of hanger bolts on opposite sides of the column, only a single hanger bolt 26 being visible in FIG. 1. A steering wheel 28 is attached to one end of a steering shaft, not shown, rotatably supported on the mast jackets 18,20.

An annulus 30, FIG. 2, is defined at an overlap between the upper and lower tubular mast jackets 20,18. A ball sleeve assembly 31 made by a method according to this invention is disposed in the annulus 30 and includes a plurality of steel spheres 32 having diameters exceeding the radial extent or dimension of the annulus 30 and interference press fitted in the annulus. The hardness of the spheres 32 exceeds the hardness of the mast jackets 18,20 so that during a collapse stroke of the steering column, characterized by an increase in the length of the overlap between the mast jackets, the spheres 32 cold form or plow tracks in the mast jackets.

The ball sleeve assembly 31 further includes a tubular plastic ball sleeve 34. The ball sleeve 34 functions in conventional fashion to maintain the relative positions of the spheres during a collapse stroke of the steering column and as a platform for transporting and handling the spheres prior to installation in the annulus 30.

Figure 3A:
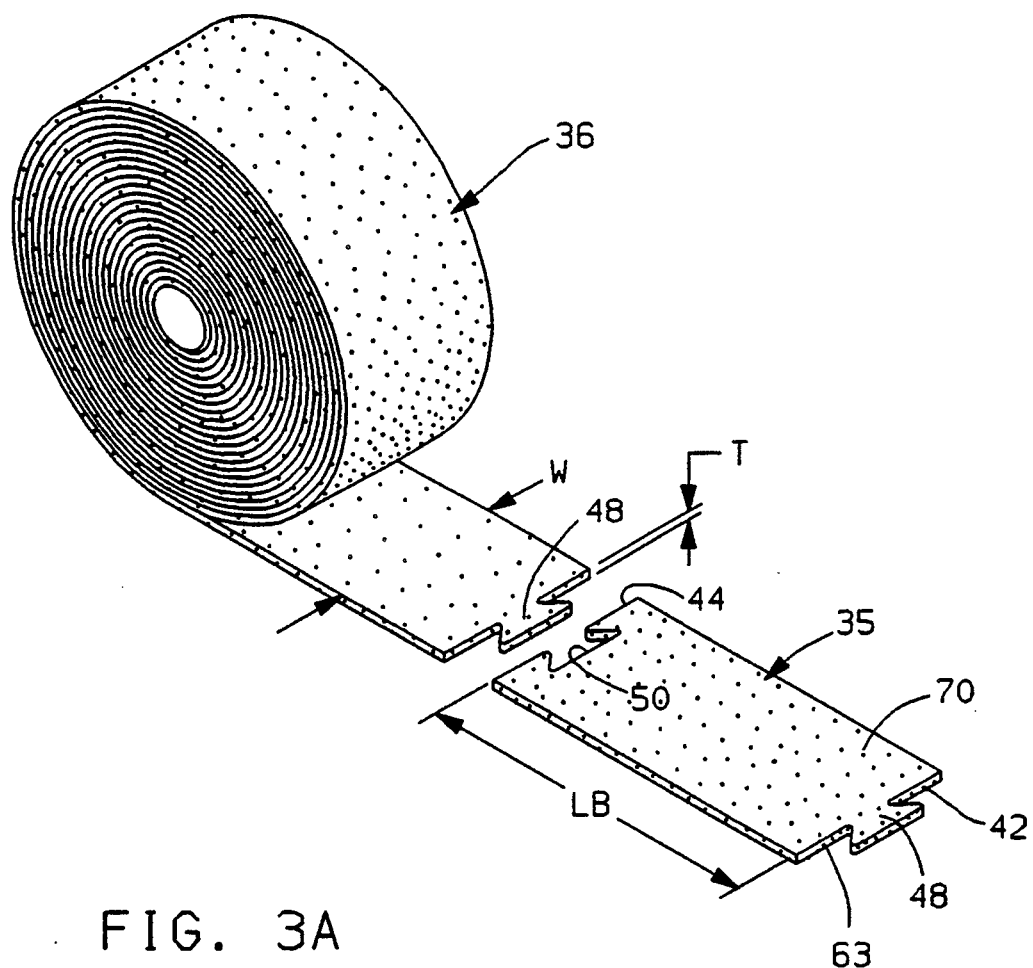
FIGS. 3A-3F illustrate steps in the method according to this invention of making a plastic ball sleeve assembly.

The method according to this invention of making the ball sleeve assembly 31 includes a first step of forming a flat blank 35, FIG. 3A. In a preferred embodiment, the flat blank is a severed end of a continuous roll 36 of sheet plastic, preferably nylon or other polymeric material, but may be formed by in-line extrusion or any other convenient method. In the preferred embodiment, the sheet plastic has a thickness dimension T which is less than the diameter of the spheres 32 and the roll has a width dimension W, FIG. 3A, defining a first dimension of the flat blank 35 corresponding to the length of the ball sleeve. The flat blank 35 has a second dimension LB between a first edge 42 and a second edge 44 of the blank corresponding to the circumference of the ball sleeve 34. The apparatus for severing the blank 35 from the roll 36 may simultaneously form a tang 48 on the first edge 42 and a corresponding notch 50 in second edge 44.

Figure 3B:
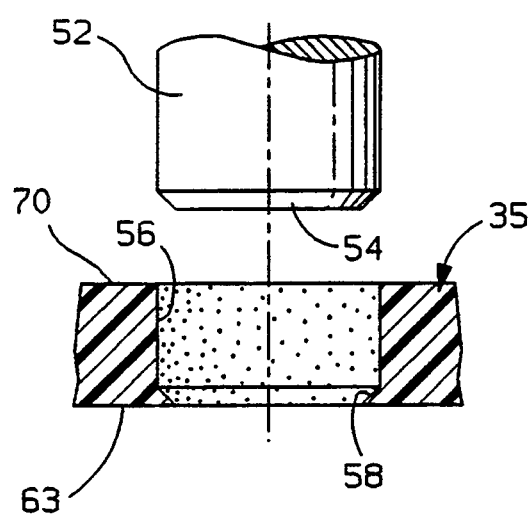
Figure 3C:
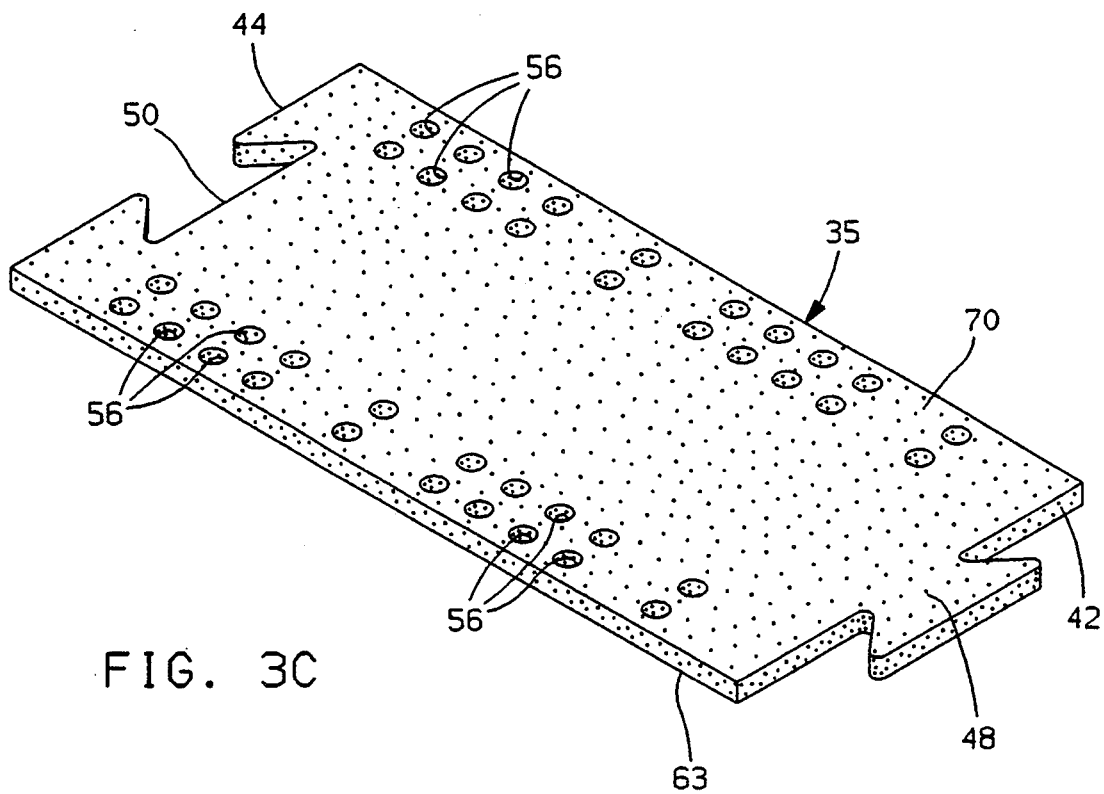

The blank is subjected to a plurality of mechanical cold forming operations, described below in an arbitrary one of several possible sequential series of cold forming process steps. First, for example, the blank 35 is impacted by a cylindrical punch 52, FIG. 3B, perpendicular to the plane of the blank. The punch 52 has a diameter corresponding to the diameter of the spheres 32 and a frusto-conical shoulder 54. The impact of the punch 52 cold forms a ball socket 56 in the form of a cylindrical bore in the blank and the shoulder 54 imprints a small, integral frusto-conical lip 58 in the blank, FIG. 3B. The apparatus holding the punch 52 may hold a plurality of punches whereby a plurality of ball sockets 56, FIG. 3C, are formed simultaneously.

Figure 3D:
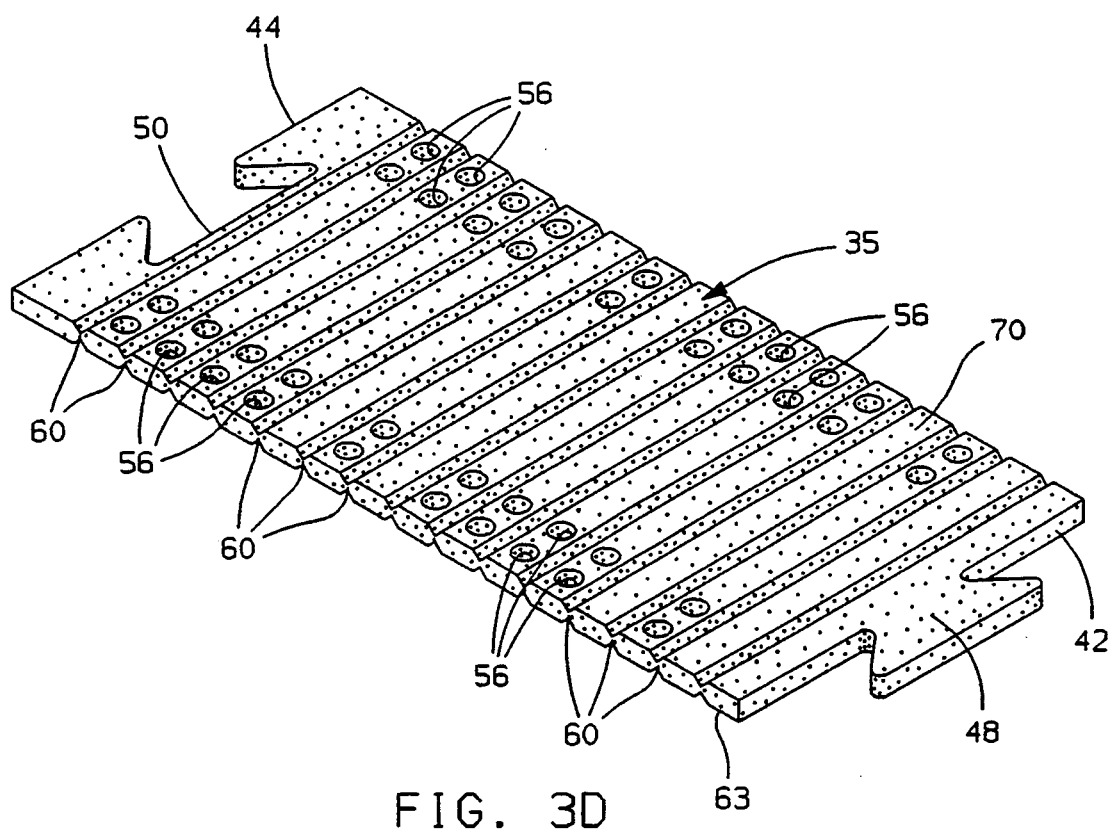

After the ball sockets 56 are cold formed, the blank is further cold formed to define a plurality of integral, living hinges 60, FIG. 3D, extending parallel to the edges 42,44 of the blank, i.e. parallel to a length dimension L of the ball sleeve 34, FIGS. 2, 3 F. Living hinges are conveniently cold formed by squeezing the blank between elongated punches to effect localized permanent strain of the plastic at the apexes of the living hinges. Effecting permanent strain of the plastic blank 35 at the apexes of the living hinges 60 is important to assure adequate strength at the hinges.

Figure 3E:
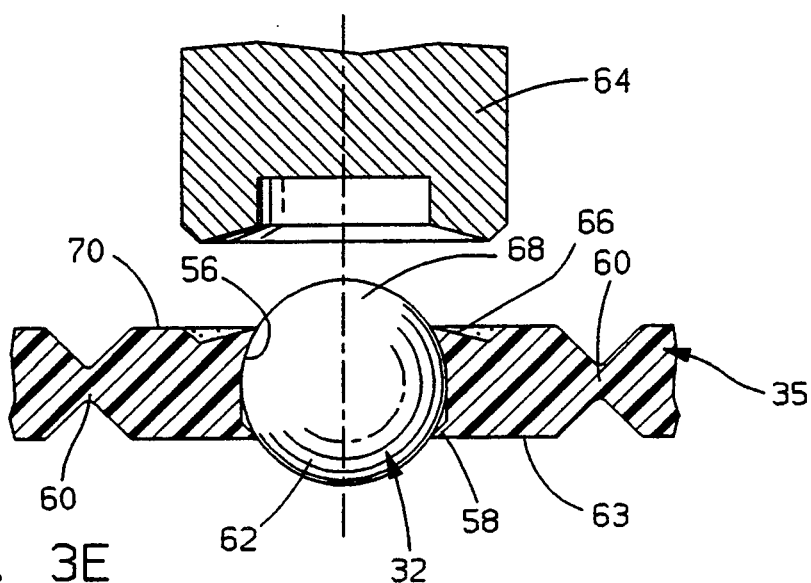

As seen best in FIG. 3E, after the living hinges 60 are formed, the spheres 32 are inserted in respective ones of the ball sockets 56. The integral lips 58 prevent dislodgement of the spheres but permit a first surface segment 62 of each sphere 32 to project beyond a planar side 63 of the blank. After the spheres are seated in the sockets, the blank 35 is further cold formed by another punch-like apparatus 64 which permanently deforms or coins the blank to define a second retaining lip 66 around each of the ball sockets 56. The second retaining lip 66 prevents dislodgement of the sphere but permits a second surface segment 68 thereof to project beyond a planar side 70 of the blank. While the method according to this invention has been described as including the step of severing the blank 35 prior to the above described cold forming steps, it is contemplated that the blank may be severed after the cold forming steps.

Figure 3F:
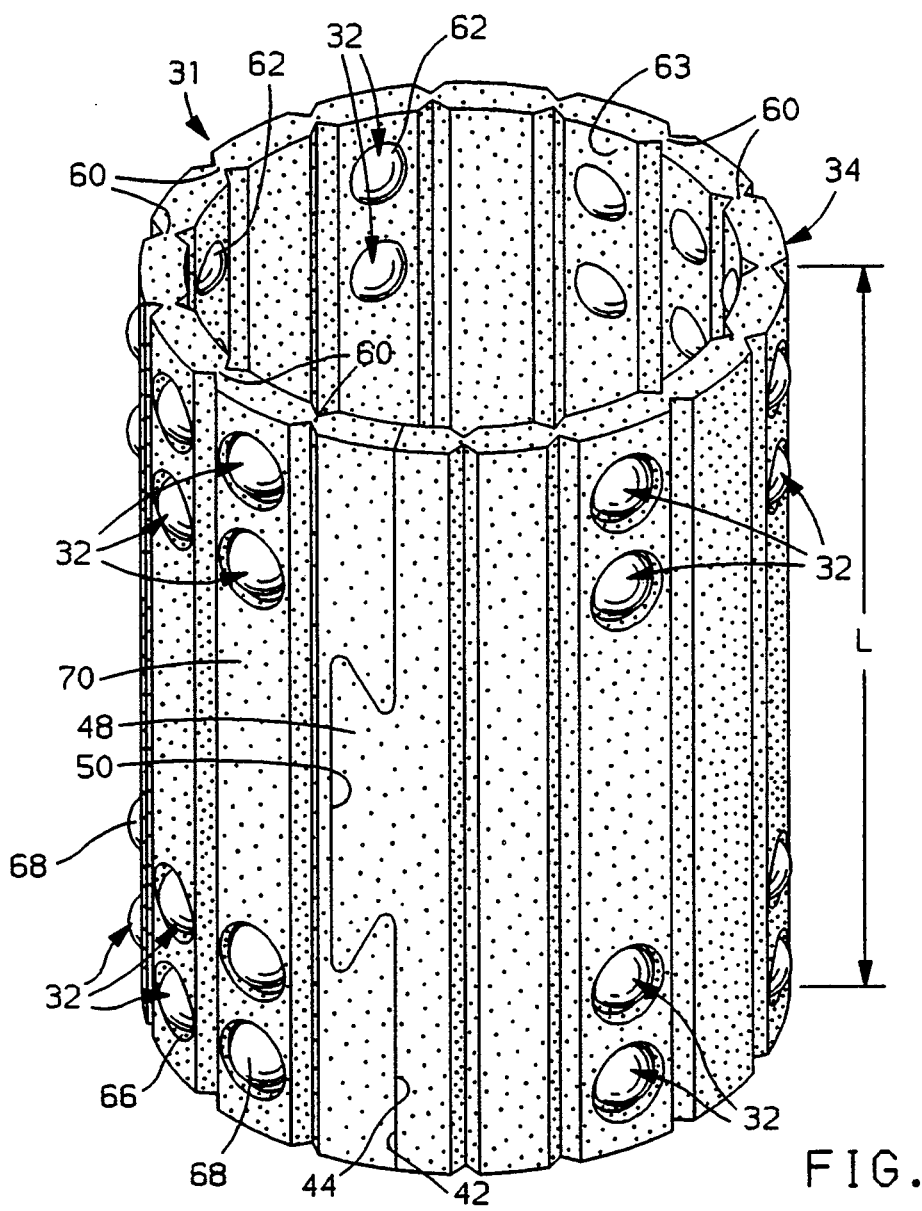

With the spheres retained in the ball sockets, the flat blank 35 is flexed at the living hinges 60 until the first edge 42 abuts the second edge 44, FIG. 3F. The tubular sleeve 34 thus defined has a diameter and a length dimension dictated by the length dimension LB and the width dimension W, respectively, of the blank which, in turn, are selected to conform to the physical characteristics of the annulus 30 between the mast jackets 18,20 of the steering column.

In a preferred embodiment, the tang 48 on the edge 42 seats in the notch 50 in the edge 44 of the blank to capture the tubular shape of the sleeve 34. Then, with the sleeve 34 positioned at the mouth of the annulus, the jackets are telescoped together and the exposed surface segments 62,68 of the spheres engage the mast jackets to effect the interference press fit of the spheres between the mast jackets. It is contemplated that the blanks are most conveniently shipped and handled flat and that the step of flexing the blank to form the sleeve 34 is performed near the station where the sleeve is installed in the annulus 30.

The method of making a plastic ball sleeve assembly according to this invention affords manufacturing advantages relative to the aforesaid method including injection molding of the plastic ball sleeves. For example, forming flat blanks as described above is more economical then injection molding sleeves from raw plastic. Further, apparatus for mechanically cold forming the ball sockets, the living hinges, and the retaining lips can be relatively simply and economically altered to accommodate different sleeve characteristics such as number and pattern of ball sockets and sleeve wall thickness.

The embodiments of the invention in which an exclusive property or privilege is claimed are defined as follows:

1. A method of making a ball sleeve assembly including a tubular plastic sleeve and a plurality of hard metal spheres comprising the steps of:

forming from a plastic characterized by being permanently deformable by application of compressive force thereto a sleeve blank defining a flat plane and having a thickness dimension less than the diameter of said spheres, cold forming a plurality of ball sockets in said sleeve blank by applying compressive force to said sleeve blank perpendicular to said flat plane, cold forming a plurality of integral parallel living hinges on said sleeve blank by applying compressive force to said sleeve blank perpendicular to said flat plane, inserting each of said spheres in a respective one of said ball sockets, cold forming said sleeve blank by applying compressive force thereto perpendicular to said flat plane to define an integral retaining means operative to prevent dislodgement of said spheres from said ball sockets while exposing a pair of surface segments of each of said spheres on opposite sides of said sleeve blank, and forming a tubular sleeve by flexing said sleeve blank at said living hinges.

2. A method of making a ball sleeve assembly including a tubular plastic sleeve and a plurality of hard metal spheres comprising the steps of:

forming into a roll a continuous sheet of a plastic characterized by being permanently deformable by application of compressive force thereto and having a thickness dimension less than the diameter of said spheres and a predetermined width dimension between a pair of parallel side edges of said sheet, unrolling said roll and severing from said continuous sheet an end thereof to form a sleeve blank defining a flat plane and having a pair of end edges perpendicular to said side edges of said sheet, forming on a first of said end edges a tang and on a second of said end edges a notch having a shape corresponding to the shape of said tang, cold forming a plurality of ball sockets in said sleeve blank by applying compressive force to said sleeve blank perpendicular to said flat plane, cold forming a plurality of integral living hinges on said sleeve blank parallel to said end edges by applying compressive force to said sleeve blank perpendicular to said flat plane, inserting each of said spheres in a respective one of said ball sockets, cold forming said sleeve blank by applying compressive force thereto perpendicular to said flat plane to define an integral retaining means operative to prevent dislodgement of said spheres from said ball sockets while exposing a pair of surface segments of each of said spheres on opposite sides of said sleeve blank, and forming a tubular sleeve by flexing said sleeve blank at said living hinges until one of said end edges of said sleeve blank abuts the other of said end edges of said sleeve blank with said tang in interlocking relationship in said notch.

3. The method of making a ball sleeve assembly recited in claim 2 wherein the plastic is nylon.

4. The method of making a ball sleeve assembly recited in claim 3 wherein the step of cold forming a plurality of ball sockets in said sleeve blank by applying compressive force to said sleeve blank perpendicular to said flat plane includes, forming each of said ball sockets to define a cylindrical bore through said sleeve blank perpendicular to said flat plane, and the step of cold forming said sleeve blank by applying compressive force thereto perpendicular to said flat plane to define an integral retaining means includes cold forming concurrently with each of said cylindrical bores an integral annular lip around a first end of each of said cylindrical bores operative to prevent dislodgement of the corresponding one of said spheres through said first end of said bore, and coining said sleeve blank after said spheres are inserted in said cylindrical bores to define an integral annular lip around a second end of each of said cylindrical bores operative to prevent dislodgement of the corresponding one of said spheres through said second end of said bore.

* * * * *